E. S. SMITH.
SPRING TIRE.
APPLICATION FILED OCT. 29, 1918.

1,302,477.

Patented Apr. 29, 1919.
2 SHEETS—SHEET 1.

Witnesses

Inventor
E. S. Smith
By Victor J. Evans
Attorney

E. S. SMITH.
SPRING TIRE.
APPLICATION FILED OCT. 29, 1918.

1,302,477.

Patented Apr. 29, 1919.
2 SHEETS—SHEET 2.

Witnesses

Inventor
E. S. Smith
By Victor J. Evans
Attorney

UNITED STATES PATENT OFFICE.

EDWARD SCOTT SMITH, OF SELMA, CALIFORNIA.

SPRING-TIRE.

1,302,477. Specification of Letters Patent. Patented Apr. 29, 1919.

Application filed October 29, 1918. Serial No. 260,115.

*To all whom it may concern:*

Be it known that I, EDWARD SCOTT SMITH, a citizen of the United States, residing at Selma, in the county of Fresno and State of California, have invented new and useful Improvements in Spring-Tires, of which the following is a specification.

This invention relates to vehicle tires, particularly to those of the cushion type, and has for its object the provision of a tire formed of inner and outer metallic bands having disposed therebetween a plurality of springs, the sides of the tire being closed by interfitting plates arranged in sliding relation so as to exclude dirt from the interior of the tire while not interfering with the resilience thereof.

An important object is the provision of a tire of this character which will be extremely simple and inexpensive in manufacture, efficient in its cushioning action, durable in service and a general improvement in the art.

With the above and other objects and advantages in view, the invention consists in the details of construction to be hereinafter more fully described and claimed, and illustrated in the accompanying drawings, in which:—

Figure 1:
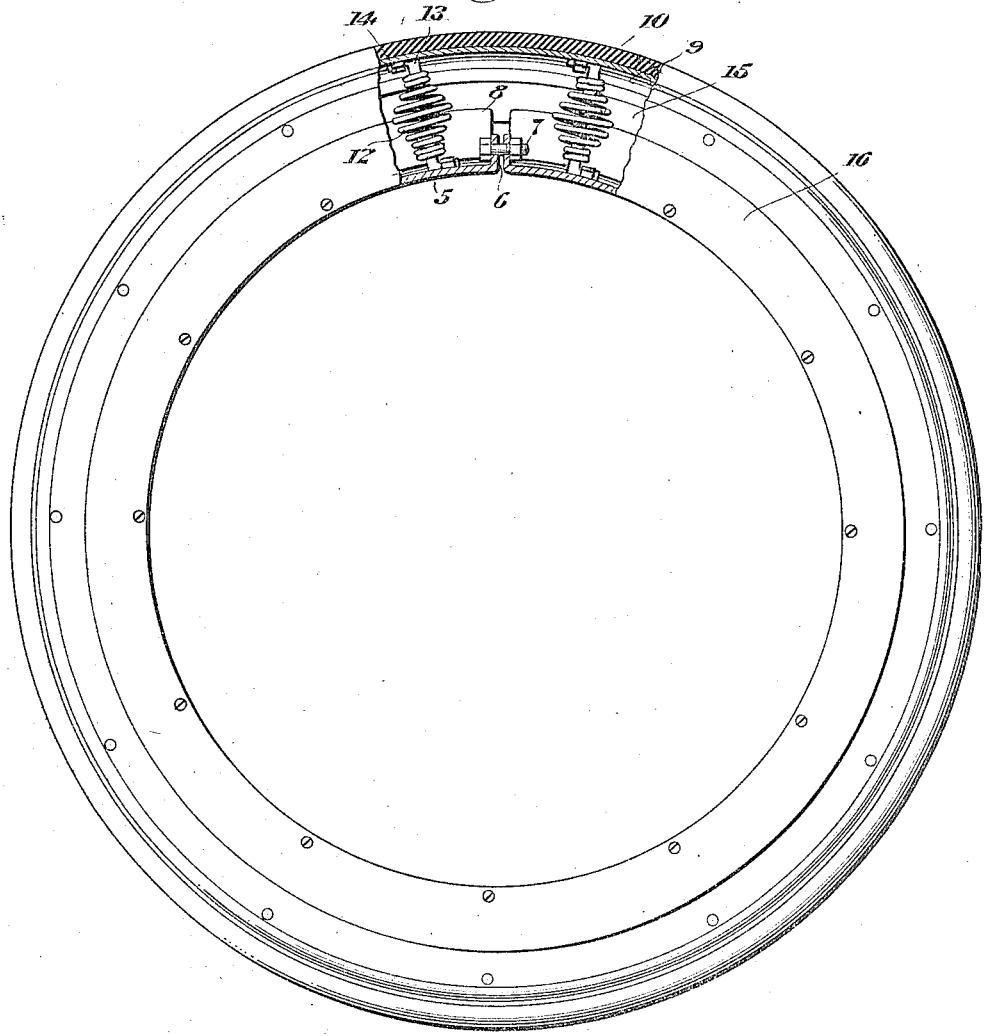
Figure 1 is a side elevation of my tire with parts broken away and in section.
Figure 2:
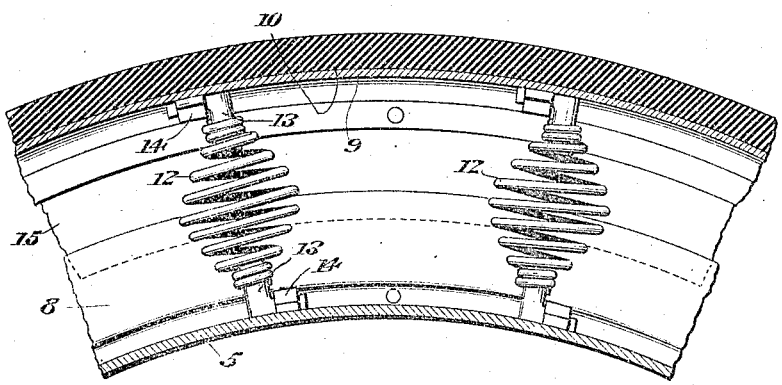
Fig. 2 is an enlarged fragmentary longitudinal sectional view.
Figure 3:
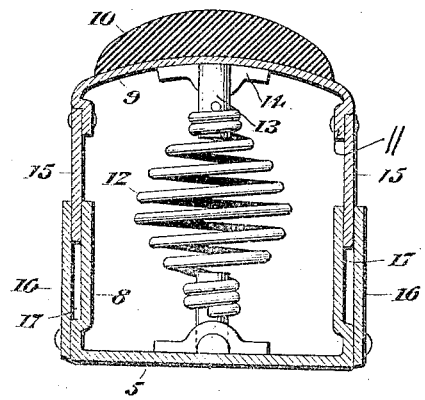
Fig. 3 is a cross sectional view.

Referring more particularly to the drawing, the numeral 5 designates the inner band of the tire which is formed preferably of steel and which is interrupted at a point in its length and provided at its ends with outwardly extending ears 6 through which extends a clamping bolt 7 whereby the tire may be properly secured upon the rim of any ordinary type of motor vehicle wheel. The band 5 is provided at its edges with outwardly extending flanges 8 which may be formed integrally upon the band or secured thereto, as preferred. The flanges 8 are preferably offset inwardly from the extreme edges of the band for a purpose to be hereinafter made apparent. The outer band is designated by the numeral 9 and is provided upon its outer periphery with a tread portion 10 of suitable material such as rubber or leather. The outer band 9 is provided at its side edges with inwardly offset flanges 11 alining with the flanges 8 of the inner band 5.

In order to provide resilience, I provide throughout the circumference of the tire a plurality of bracket members 14 which are secured upon the inner and outer peripheries of the outer and inner bands, respectively. The brackets are provided with substantially semicircular holes through which extend the correspondingly shaped legs of securing members 13 which are right angular in shape, as shown and which have their other legs arranged in radial alinement. A coil spring 12 is disposed radially between each associated pair of securing members and each spring has its terminal convolution wrapped tight about the radial alining legs of the securing members with the terminals of the springs passed through transverse holes formed in the inner ends of the securing members, as clearly shown.

In order to exclude dirt and gravel from the interior of the tire, I provide plates 15 secured upon the flanges 11 of the outer band and disposed against the outer sides of the flanges 8 of the inner band. Other ring-like plates 16 are secured upon the outermost edges of the inner band 5 and bear against the outer sides of the plates 15, the plates 16 extending outwardly the same distance as the flanges 8 and being arranged in spaced parallel relation thereto to define pockets 17.

In applying the tire to a wheel, the inner band 5 alone is first positioned upon the rim after which the clamping bolt 7 is tightened to hold this band firmly upon the rim. After the inner band is thus secured the outer band is properly positioned with respect thereto and the plates 15 and 16 are secured in position upon the outer and inner bands respectively.

In the use of the tire, it will be seen that during its travel, when the outer band moves toward the inner band the plates 15 will slide within the pockets 17 defined between the flanges 8 and plates 16 so as not to interfere with the resilience of the tire while retaining a tight closure effect for preventing access of gravel or dirt to the interior of the tire.

From the foregoing description and a study of the drawings it will be apparent that I have thus provided a very simple resilient tire in which the use of air is obviated and which will be consequently puncture and blowout proof while still possessing a great degree of resilience.

While I have shown and described the preferred embodiment of the invention, it will of course be readily understood that I reserve the right to make such changes in the form, construction and arrangement of parts as will not depart from the spirit of the invention or the scope of the subjoined claims.

Having thus described my invention what is claimed is:—

1. A resilient tire comprising inner and outer bands, a plurality of brackets secured upon the inner and outer peripheries of said outer and inner bands respectively, L-shaped securing members having one leg engaged within said brackets and non-rotatable with respect thereto, the other legs of said securing members being arranged in radial alinement and perforated, and springs disposed between said alining legs, said springs having their terminal convolutions coiled tightly about the associated legs and their ends passed through said perforations.

2. A resilient tire comprising inner and outer concentric bands, a plurality of brackets secured upon and extending transversely of the inner and outer peripheries of said outer and inner bands, respectively, L-shaped securing members having one leg engaged within said brackets and non-rotatable with respect thereto, the other legs being arranged in radial alinement and springs disposed between said alining legs and having their intermediate convolutions of relatively large diameter and their terminal convolutions embracing said last named legs.

In testimony whereof I affix my signature.

EDWARD SCOTT SMITH.

Copies of this patent may be obtained for five cents each, by addressing the "Commissioner of Patents, Washington, D. C."